(12) United States Patent
Tally et al.

(10) Patent No.: US 10,982,795 B2
(45) Date of Patent: Apr. 20, 2021

(54) CLAMPING DEVICE CONFIGURED TO HOLD ONE OR MORE LONGITUDINAL ELEMENTS

(71) Applicant: TYCO ELECTRONICS CORPORATION, Berwyn, PA (US)

(72) Inventors: Paul Craig Tally, Santa Clara, CA (US); Thomas D. Ratzlaff, Menlo Park, CA (US); Nicholas John Swatko, Mountain View, CA (US)

(73) Assignee: TE CONNECTIVITY SERVICES GmbH, Schaffhausen (CH)

( * ) Notice: Subject to any disclaimer, the term of this patent is extended or adjusted under 35 U.S.C. 154(b) by 0 days.

(21) Appl. No.: 14/950,806

(22) Filed: Nov. 24, 2015

(65) Prior Publication Data

US 2017/0146154 A1 May 25, 2017

(51) Int. Cl.
*F16L 3/10* (2006.01)
*H02G 3/32* (2006.01)
*F16L 3/22* (2006.01)

(52) U.S. Cl.
CPC ............. *F16L 3/1075* (2013.01); *F16L 3/222* (2013.01); *H02G 3/32* (2013.01)

(58) Field of Classification Search
CPC ..... F16L 3/1075; F16L 3/1058; F16L 3/1025; F16L 3/13; F16L 3/237; Y10T 24/1471; Y10T 292/20; Y10T 292/1043; Y10T 292/228; Y10T 292/205; Y10T 292/0863; Y10T 403/595; E05B 15/0046; E05B 71/00; E05B 73/0041; E05B 75/00; H02G 3/32

(Continued)

(56) References Cited

U.S. PATENT DOCUMENTS 1,776,280 A * 9/1930 Boyd .................... E21B 17/043
285/91
1,971,488 A * 8/1934 Jorgensen ............... F23D 11/04
248/411

(Continued)

FOREIGN PATENT DOCUMENTS

CN 206669155 U * 11/2017
CN 207514393 U * 6/2018

(Continued)

OTHER PUBLICATIONS

Matt Sawyer and Randy Gautreaux; Amphenol Pcd Connecting People and Technology; Catalog; Jun. 2015; 32 Pages.

*Primary Examiner* — Kimberly T Wood

(57) ABSTRACT

Clamping device includes a clamp frame that is configured to move between an open configuration, in which the clamp frame is configured to receive at least one longitudinal element, and a closed configuration, in which the clamp frame wraps around and holds the at least one longitudinal element. The clamp frame includes a coupling end having an inner surface and a coupling base having an outer surface. The inner and outer surfaces have profiles that form a locked engagement to hold the clamp frame in the closed configuration. The clamping device also includes a secondary locking mechanism that secures the coupling end and the coupling base to each other. The secondary locking mechanism is activated after the clamp frame is held in the closed configuration by the locked engagement.

20 Claims, 9 Drawing Sheets

(58) Field of Classification Search
USPC ..... 248/74.1, 74.2, 74.3, 74.4, 74.5; 285/82, 285/197, 198, 407, 411, 365, 420, 87, 91, 285/406, 88; 403/344, 355, 356, 310; 70/14, 18, 19, 58, 177, 178, 180
See application file for complete search history.

(56) References Cited

U.S. PATENT DOCUMENTS

| | | | | |
|---|---|---|---|---|
| 2,355,096 A * | 8/1944 | Morehouse | F16L 3/1233 | 174/40 CC |
| 2,744,771 A * | 5/1956 | Laurent | F16L 37/123 | 285/18 |
| 3,435,823 A * | 4/1969 | Edwards | A61B 17/11 | 24/20 TT |
| 3,460,788 A * | 8/1969 | Goldman | F16L 3/1233 | 24/279 |
| 3,513,508 A * | 5/1970 | Modeme | F16L 3/12 | 24/11 M |
| 3,552,696 A * | 1/1971 | Orenick | F16L 3/1236 | 248/71 |
| 3,581,349 A * | 6/1971 | Verspieren | F16L 3/12 | 24/16 PB |
| 3,847,331 A * | 11/1974 | Vallinotto | F16L 3/12 | 248/74.3 |
| 3,906,592 A * | 9/1975 | Sakasegawa | F16L 3/1233 | 24/487 |
| 4,283,816 A * | 8/1981 | Tanaka | F16G 11/00 | 24/16 PB |
| 4,317,262 A * | 3/1982 | Wells, Jr. | F16L 3/12 | 24/16 PB |
| 4,382,570 A * | 5/1983 | Craig | F16L 3/1008 | 24/270 |
| 4,386,752 A * | 6/1983 | Pavlak | F16L 3/127 | 24/543 |
| 4,609,171 A * | 9/1986 | Matsui | F16L 3/12 | 24/16 PB |
| 4,779,828 A * | 10/1988 | Munch | H02G 3/32 | 24/16 PB |
| 4,867,482 A * | 9/1989 | Hendrickson | F16L 17/04 | 285/12 |
| 5,257,439 A * | 11/1993 | LeBlanc | A61C 7/18 | 24/269 |
| 5,344,112 A * | 9/1994 | Peterson | B60H 1/3229 | 24/279 |
| 5,354,021 A | 10/1994 | Farrell | | |
| 5,366,263 A * | 11/1994 | Hendrickson | F16L 17/04 | 24/270 |
| 5,653,411 A * | 8/1997 | Picco | F16L 3/2235 | 24/339 |
| 5,819,374 A * | 10/1998 | Chiles | F16L 3/1236 | 24/16 PB |
| 6,209,827 B1 * | 4/2001 | Kawai | F16B 21/02 | 248/49 |
| 6,443,403 B1 | 9/2002 | Page et al. | | |
| 6,732,982 B1 | 5/2004 | Messinger | | |
| 7,216,862 B2 | 5/2007 | Walsh | | |
| 8,708,289 B2 * | 4/2014 | Allenbach | F16L 3/2235 | 248/68.1 |
| 8,759,682 B2 | 6/2014 | Devouge | | |
| 9,169,952 B2 * | 10/2015 | Horgan | F16B 5/0275 | |
| 2003/0171759 A1 * | 9/2003 | Sadler | A61F 6/206 | 606/135 |
| 2013/0160246 A1 | 6/2013 | Hajduch | | |
| 2013/0334815 A1 * | 12/2013 | Kayacik | F16L 23/08 | 285/420 |
| 2014/0131528 A1 * | 5/2014 | Blakeley | H02G 3/32 | 248/74.2 |
| 2016/0003378 A1 * | 1/2016 | Frizzell | H02G 3/32 | 248/74.5 |

FOREIGN PATENT DOCUMENTS

| | | | | |
|---|---|---|---|---|
| CN | 207740586 U * | 8/2018 | | |
| EP | 0703394 A1 * | 3/1996 | | F16L 3/1008 |
| EP | 2469673 | 3/2014 | | |

\* cited by examiner

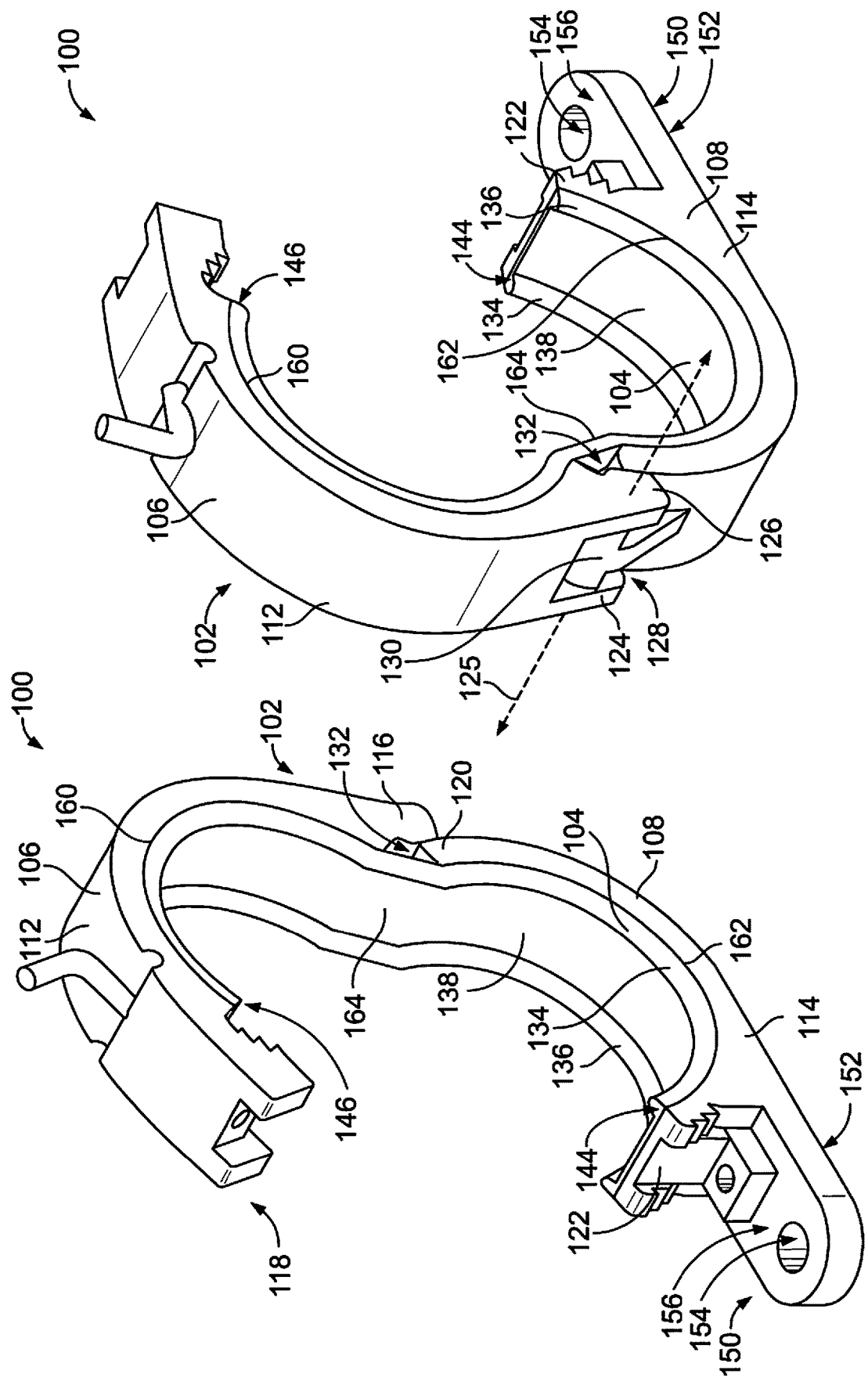

CLAMPING DEVICE CONFIGURED TO HOLD ONE OR MORE LONGITUDINAL ELEMENTS

BACKGROUND

The subject matter relates generally to clamping devices (or clamps) that are configured to hold one or more longitudinal elements, such as wires, cables (e.g., electrical or optical), tubes, or pipes.

It is often desirable to secure at least one longitudinal element to another structure for holding the longitudinal element at a designated position. Alternatively or in addition to this, it may also be desirable to bundle a plurality of longitudinal elements together. The longitudinal elements may be rods, beams, conduits, and the like. Conduits are configured to transmit signals or power or to transfer matter. Conduits may include electrical cables, optical fibers, tubes, pipes, and the like. For instance, large systems (e.g., electrical and mechanical systems of an aircraft) may interconnect different devices through cables. The cables may supply power, supply fluid, or communicate data between the devices. The cables are typically routed along designated paths between the devices to minimize weight and organize cables to optimize the available space. This may be especially true for systems that have numerous cables.

In order to manage the cables and/or route the cables along certain paths between the devices, it may be necessary to hold one or more of the cables with a clamping device, such as a P-clamp. The P-clamp is so-called because it resembles the letter "P" during use. Conventional P-clamps include a metallic band that is wrapped around one or more cables. The P-clamp typically includes a thru-hole at a distal end of the band that aligns with another thru-hole that is near a proximal end of the band. The two thru-holes are configured to receive a screw that is secured to an external structure.

Conventional clamping devices, such as the P-clamp, can be difficult to use in certain situations. For example, it can be challenging for a technician to wrap the clamping device around the cables, align the thru-holes for receiving the screw, and then, while the technician holds the clamp in his or her hand, secure the clamping device to the other structure. This can be especially challenging when the clamping device must be secured to a structure that is difficult to reach. For instance, some spaces within an aircraft (e.g. a wing) may only be accessible using a single hand.

Accordingly, there is a need for an alternative clamping device that may be wrapped around at least one longitudinal element and, if necessary, secured to an external structure.

BRIEF DESCRIPTION

In an embodiment, a clamping device is provided that includes a clamp frame that is configured to move between an open configuration, in which the clamp frame is configured to receive at least one longitudinal element, and a closed configuration, in which the clamp frame wraps around and holds the at least one longitudinal element. The clamp frame includes a coupling end having an inner surface and a coupling base having an outer surface. The inner and outer surfaces have profiles that form a locked engagement to hold the clamp frame in the closed configuration. The clamping device also includes a secondary locking mechanism that secures the coupling end and the coupling base to each other. The secondary locking mechanism is activated after the clamp frame is held in the closed configuration by the locked engagement.

In one aspect, the coupling end includes at least one grip element having the inner surface and the coupling base includes at least one mating element having the outer surface. The grip element and the mating element of the coupling end and the coupling base, respectively, engage each other to hold the clamping device in a closed configuration. In some aspects, the grip element and mating element may enable a partially-closed configuration that facilitates positioning longitudinal elements within a passage of the clamping device.

In another aspect, the secondary locking mechanism includes a fastener that is inserted through respective passages of the coupling end and the coupling base. The fastener may be a threadless pin or a threaded pin.

In an embodiment, a clamping device is provided that includes a first clamp section having a joint end and a coupling end. The clamping device also includes a second clamp section having a joint end and a coupling base. The joint ends of the first and second clamp sections are movably coupled to each other such that the first and second clamp sections are movable between an open configuration and a closed configuration. The coupling end of the first clamp section and the coupling base of the second clamp section engage each other in the closed configuration to form a clamp frame for holding at least one longitudinal element, The first and second clamp sections form a gap therebetween proximate to the joint ends. The clamping device also includes an inner layer that is coupled to and extends along the first and second clamp sections. The inner layer is configured to engage the at least one longitudinal element. The inner layer extends over the gap.

BRIEF DESCRIPTION OF THE DRAWINGS

FIG. 1 is a perspective view of a clamping device formed in accordance with an embodiment when the clamping device is in an open configuration.

FIG. 2 is another perspective view of the clamping device of FIG. 2 when the clamping device is in the open configuration.

DETAILED DESCRIPTION

Figure 3:
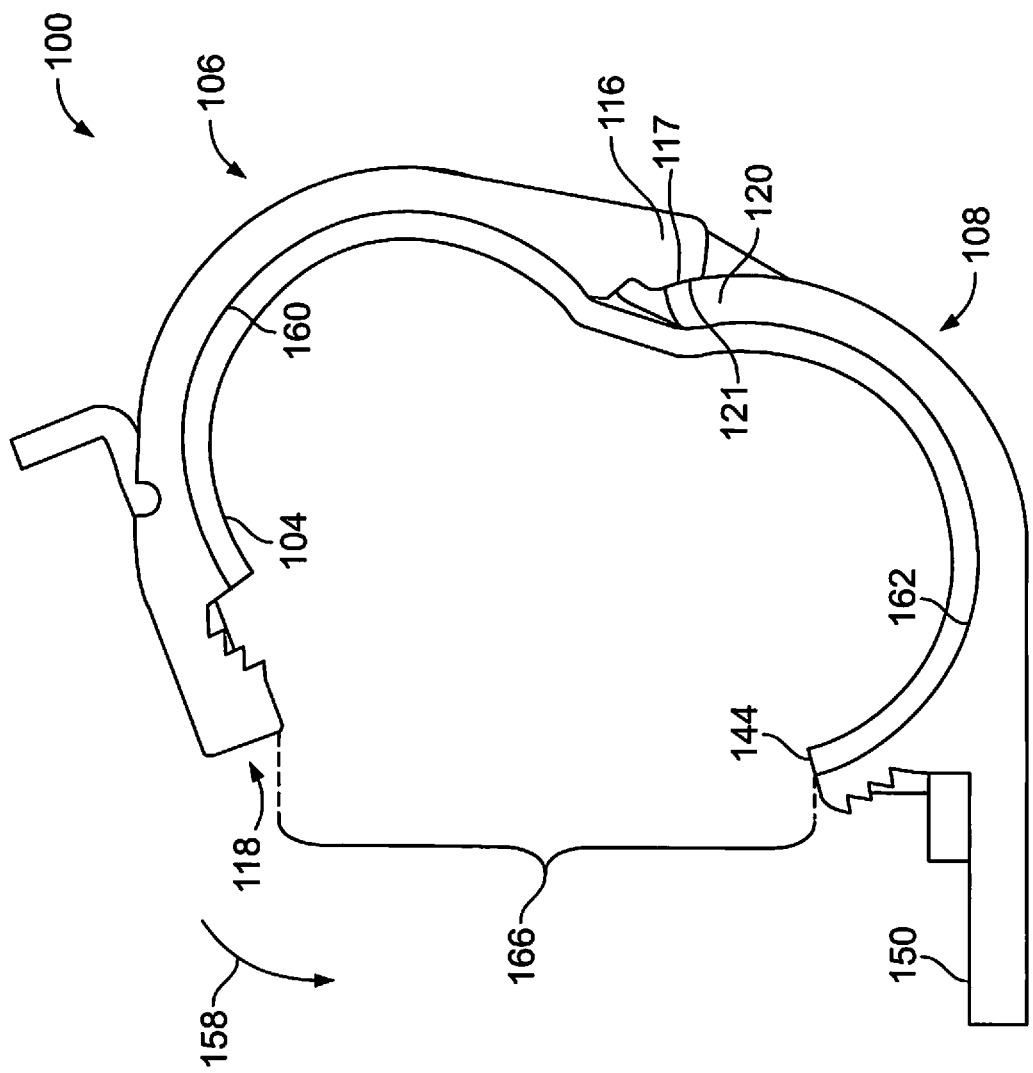
FIG. 3 is a side view of the clamping device of FIG. 2 when the clamping device is in the open configuration.

Embodiments set forth herein include clamping devices that are configured to secure one or more longitudinal segments with respect to each other and, optionally, with respect to an external structure. For example, the clamping device may be used as a wire organizer that bundles the wires and, optionally, may be secured to an external structure to position the bundle of wires at a designated position. Embodiments may reduce installation time and/or provide a simpler process for securing the longitudinal element(s). In particular embodiments, the clamping device may be implemented without using separate tools. In particular embodiments, the clamping device may provide a pinch-less hinge.

FIGS. 1 and 2 are different perspective views of a clamping device 100 formed in accordance with an embodiment. The clamping device 100 is configured to hold one or more longitudinal elements (not shown) and, optionally, be secured to an external structure. The clamping device 100 includes a clamp frame 102 and an optional inner layer 104 that is coupled to the clamp frame 102. In the illustrated embodiment, the clamp frame 102 includes a first clamp section 106 and a second clamp section 108. The first and second clamp sections 106, 108 are discrete structures that are configured to be coupled to one another to form the clamp frame 102. In FIGS. 1 and 2, the clamp frame 102 is in an open configuration such that the first and second clamp sections 106, 108 are spaced apart from each other and configured to receive the longitudinal element(s). The clamp frame 102 is also configured to be in a closed configuration (shown in FIG. 4) in which the clamp frame 102 wraps around and holds the longitudinal elements.

In other embodiments, however, the clamp frame 102 may include a continuous belt or collar that is configured to be wrapped around the longitudinal elements. For example, the first and second clamp sections 106, 108 may be formed from a continuous strip or band of a flexible element, such as a plastic or metal. The continuous strip or band may be other materials or may include other materials, such as a hook and loop fabric. In such an embodiment, the clamp frame 102 may move between the open configuration and the closed configuration and be secured to itself as described herein.

In some embodiments, the first clamp section 106 includes a section body 112, and the second clamp section 108 includes a section body 114. The section bodies 112, 114 may include a rigid or semirigid material, such as plastic (e.g., polyether ether ketone (PEEK)) or metal (e.g., aluminum or alloy thereof). In some embodiments, the section bodies 112, 114 are molded to include the features described herein. Alternatively or in addition to being molded, the section bodies 112, 114 may be bent, etched, or otherwise shaped to include the features described herein. In the illustrated embodiment, the section bodies 112, 114 are continuous or integrated structures that the section bodies 112, 114 include only a single material. The single material may be different from the material of the inner layer 104. In other embodiments, however, the section bodies 112, 114 may include discrete components that are coupled to each other to form the section bodies.

Figure 13:
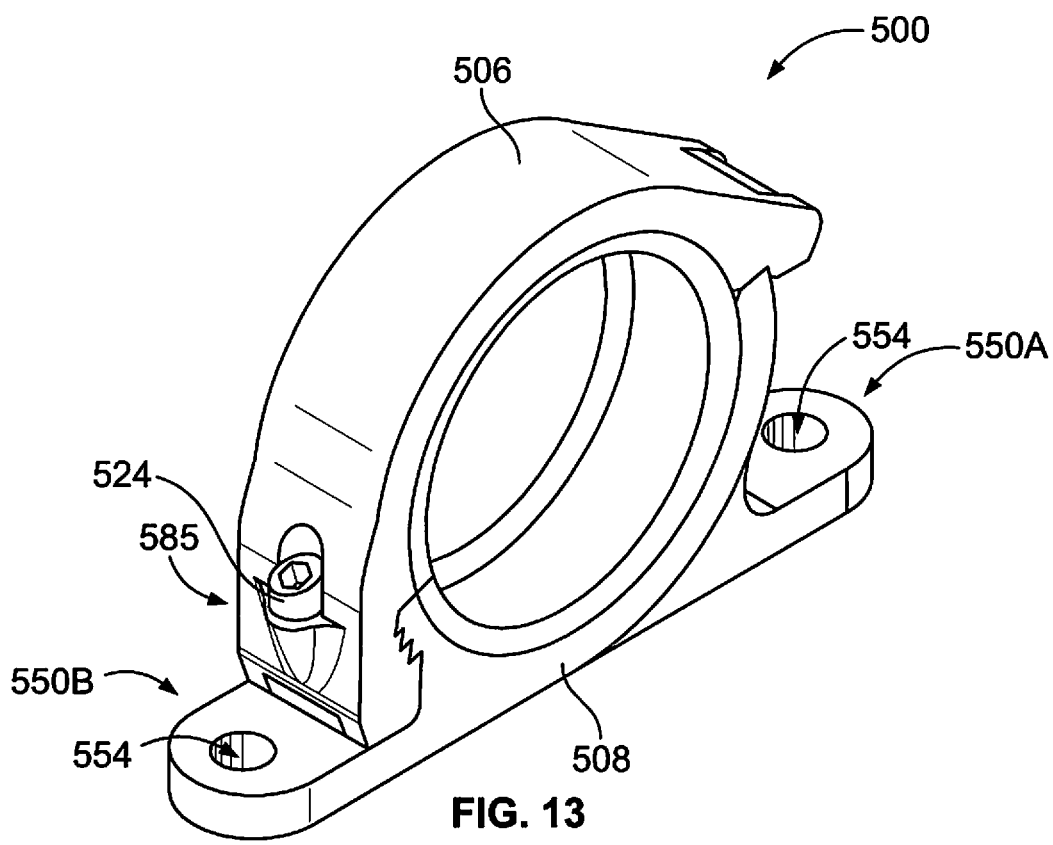
FIG. 13 illustrates a clamping device having two mounting flanges in accordance with an embodiment and a secondary locking mechanism.

The first clamp section 106 has a joint end 116 and a coupling end 118. The first clamp section 106 extends lengthwise between the joint end 116 and the coupling end 118. The second clamp section 108 includes a joint end 120 and a coupling base 122. Optionally, the second clamp section 108 includes a mounting flange or element 150 that is coupled to the section body 114. The mounting flange 150 has an outer surface 152 that is configured to be positioned adjacent to an external structure (not shown). The mounting flange 150 also includes a thru-hole 154 that is configured to receive hardware (not shown), such as a pin or plug, for securing the clamping device 100 to the external structure. The mounting flange 150 has an inner surface 156 that is opposite the outer surface 152. Optionally, the mounting flange 150 may be stacked with respect to another mounting flange (not shown) and each mounting flange may receive a portion of the hardware. Optionally, the clamp frame 102 may include more than one mounting flange. Such an embodiment is shown in FIG. 13.

The joint ends 116 and 120 are configured to be movably coupled to each other such that the first and second clamp sections 106, 108 may move relative to each other between the open configuration and the closed configuration. As shown in FIG. 2, the joint ends 116, 120 are rotatably coupled about an axis of rotation 125. For example, the joint end 116 includes first and second projections 124, 126 that define a working gap 128 therebetween. The joint end 120 includes a hinge element 130 that is received within the working gap 128. Although not shown, the hinge element 130 may include a passage (or two passages) that receive pivot elements (e.g., posts) from the first and second projections 124, 126. The passage(s) and the pivot elements may align with each other along the axis of rotation 125 and enable the first and second clamp sections 106, 108 to rotate about the axis of rotation 125.

However, it should be understood that the first and second clamp sections 106, 108 may be movably coupled in other manners. For example, the clamp frame 102 may include a floatable hinge having two axes of rotation. The first clamp section 106 may be secured to the floatable hinge and be rotatable about one axis of rotation, and the second clamp section 108 may be secured to the floatable hinge and rotatable about the other axis of rotation. Other methods of movably coupling the first and second clamp sections 106, 108 are contemplated.

Figure 6:
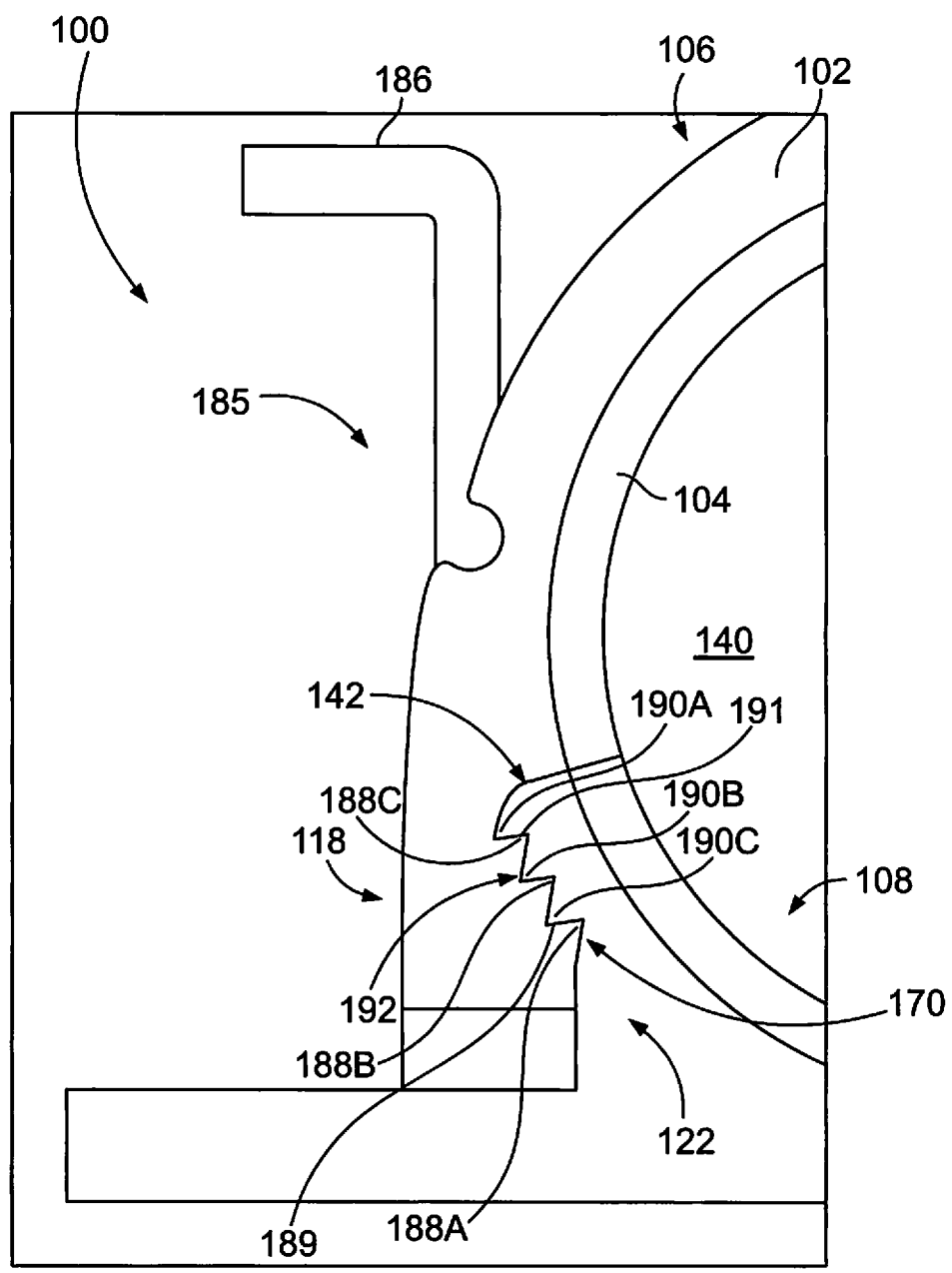
FIG. 6 is an enlarged side view of the clamping device of FIG. 2 when the clamping device is in the closed configuration.

As shown in FIGS. 1 and 2, the first and second clamp sections 106, 108 (or respective section bodies 112, 114) may form a pinching gap 132 proximate to the joint ends 116, 120, respectively. For example, the pinching gap 132 may be defined between portions of the joint ends 116, 120. When the first and second clamp sections 106, 108 are in the closed configuration, as shown in FIG. 6, the first and second clamp sections 106, 108 may form a seam 142. For certain embodiments, the inner layer 104 is configured to extend over or across the pinching gap 132 at a bridge portion 164 of the inner layer 104 to prevent, for example, longitudinal elements being inadvertently positioned within the pinching gap 132. The inner layer 104 may comprise a flexible or stretchable material. More specifically, the inner layer 104 is configured to be in a relaxed state when the clamp frame is in the closed configuration and a stretched or tensed state when the inner layer 104 is in the open configuration. In the stretched state, the inner layer 104 may provide a retracting force that facilitates closing the clamp frame 102.

The inner layer 104 may comprise an elastic or stretchable material that permits the clamp frame 102 to move between the open and closed configurations. For example, the inner layer 104 may comprise a compliant or elastomeric material. The inner layer 104 may be referred to as a compliant layer in some embodiments. The inner layer 104 may contain an elastomer or synthetic rubber. For example, the inner layer may contain at least one of silicone, chloroprene, ethylene propylene terpolymer (e.g., ethylene propylene diene monomer (EPDM)), ethylene propylene copolymer (sometimes referred to as ethylene propylene rubber or EPR), nitrile, or fluorosilicone. In some embodiments, the inner layer 104 may comprise a mesh or woven material. The inner layer may include or consist essentially of a metal material (e.g., metal mesh). For example, at least some applications of the clamping device 100 may include environments that experience high temperatures or may be used to ground the longitudinal elements. The inner layer may be injection-molded. In this example, metal particles may or may not be dispersed within the injected material. Metallic inner layers may also be formed in other manners (e.g., casting).

The inner layer 104 may be secured to interior surfaces 160, 162 of the section bodies 112, 114, respectively. For example, an adhesive may be applied to interfaces defined between the interior surfaces 160, 162 and the inner layer 104. Alternatively or in addition to the adhesive, the inner layer 104 may include projections that are inserted into corresponding cavities of the section bodies 112, 114 and form an interference fit therewith.

In the illustrated embodiment, the inner layer 104 forms first and second longitudinal ridges 134, 136 that are spaced apart from each other and joined by a recessed area 138. The first and second longitudinal ridges 134, 136 are configured to engage or grip the longitudinal element(s) when the clamp frame 102 is in the closed configuration. To this end, the inner layer 104 may be compressible or compliant to provide tolerance in gripping the longitudinal element(s). Each of the first and second longitudinal ridges 134, 136 and the recessed area 138 extend over or across the pinching gap 132 at the bridge portion 164 of the inner layer 104.

When the clamp frame 102 is in the closed configuration, the inner layer 104 may define a working passage 140 (shown in FIG. 6) through which the longitudinal element(s) extend. In some embodiments, the inner layer 104 essentially defines the entire passage 140, except for a seam 142 (shown in FIG. 6) at an interface between the first and second clamp sections 106, 108. In other embodiments, however, the inner layer 104 defines less than an entirety of the passage 140. In particular embodiments, the inner layer 104 forms a gap-less engaging surface 141 (FIG. 7) that prevents pinching of the longitudinal element(s). For example, the inner layer 104 may extend continuously (e.g., without gaps in the inner layer 104) from one layer end 144 to an opposite layer end 146.

FIG. 3 is a side view of the clamping device 100 in the open configuration. The joint ends 116, 120 have respective blocking surfaces 117, 121. The blocking surfaces 117, 121 are shaped relative to each other to form an angle limit stop. More specifically, the blocking surfaces 117, 121 may prevent or block the first clamp section 106 from rotating further away from the second clamp section 108. For example, the first clamp section 106 is blocked from rotating further in the clockwise direction with respect to the view shown in FIG. 3. Optionally, the blocking surfaces 117, 121 may be shaped to initially resist movement of the first clamp section 106 to the closed configuration. For example, the blocking surfaces 117, 121 may be shaped relative to each other such that a threshold force 158 must be applied in the counter-clockwise direction (with respect to FIG. 3) to move the first clamp section 106 to the closed configuration. In FIG. 3, each of the blocking surfaces 117, 121 is essentially planar. However, it is contemplated that the blocking surfaces 117, 121 may have other shapes.

In the open configuration, the coupling end 118 and the layer end 144 are separated by a receiving gap 166. The receiving gap 166 is sized larger than a diameter of the passage 140 (FIG. 6) to permit the longitudinal element(s) being positioned therein. Each of the interior surfaces 160, 162 of the first and second clamp sections 106, 108, respectively, may have a curved shape and the inner layer 104 may conform to the curved shape.

During installation of the longitudinal element(s), at least one of the first clamp section 106 or the second clamp section 108 may receive the longitudinal element(s). The first clamp section 106 or the second clamp section 108 may function as a temporary support that holds the longitudinal element(s) prior to the clamping device 100 being fully closed. For example, when the first and second clamp sections 106, 108 are in the open configuration, the clamping device 100 may permit positioning one or more of the longitudinal elements within the spaces defined by the first clamp section 106 or the second clamp section 108. After the longitudinal element(s) are positioned, the clamping device 100 allows the user to release the already positioned longitudinal element(s) (and the clamping device 100) and retrieve additional longitudinal elements. While the user retrieves other longitudinal elements, the first clamp section 106 and/or the second clamp section may hold the longitudinal element(s) that have already been positioned. Such embodiments may be suitable for applications in which the clamping device 100 is difficult to reach. For example, a user may be able to use a single hand for positioning the longitudinal elements, which may require multiple steps, and closing the clamping device 100. In some cases, as described below, the clamping device 100 may be only partially closed while the user is retrieving the other longitudinal elements.

Due to the shape of the first and second clamp sections 106, 108, the clamping device 100 may have a range of orientations relative to gravity G in which the clamping device 100 may momentarily hold the longitudinal element(s) prior to closing. In FIG. 3, the solid arrow represents the direction of gravity. However, the clamping device 100 may have a range of orientations relative to gravity as illustrated by the dashed arrows. In such embodiments, the mounting flange 150 is secured to the external structure prior to closing the clamping device 100.

When the first and second clamp sections 106, 108 are in the closed configuration (FIG. 6), the inner layer 104 (or the combined interior surfaces 160, 162) has a substantially circular profile. In the illustrated embodiment, each of the first and second clamp sections 106, 108 may provide about half (or about 180°) of the circular shape.

Figure 5:
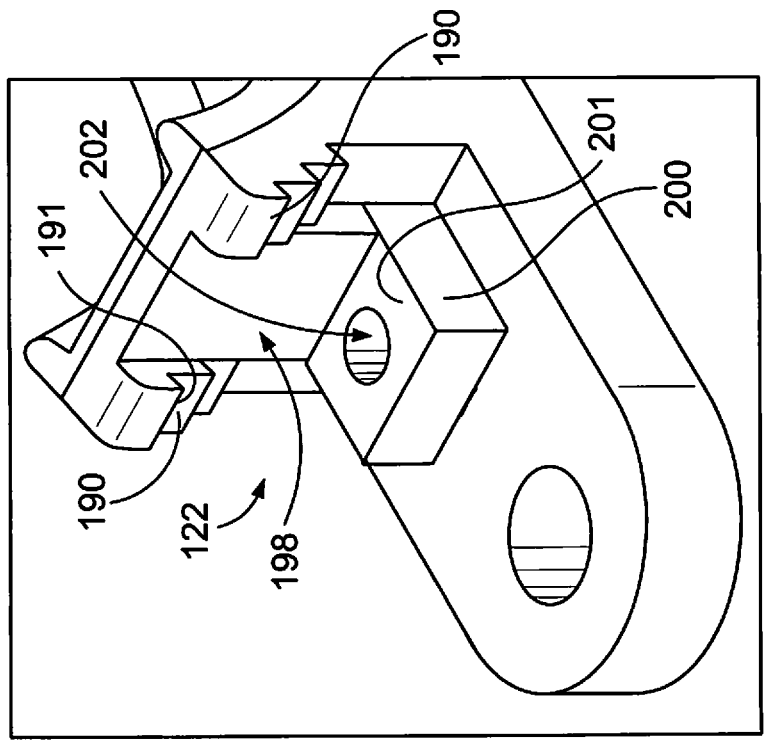
FIG. 5 is an enlarged view of the clamping device of FIG. 2 illustrating a coupling base in greater detail.
Figure 4:
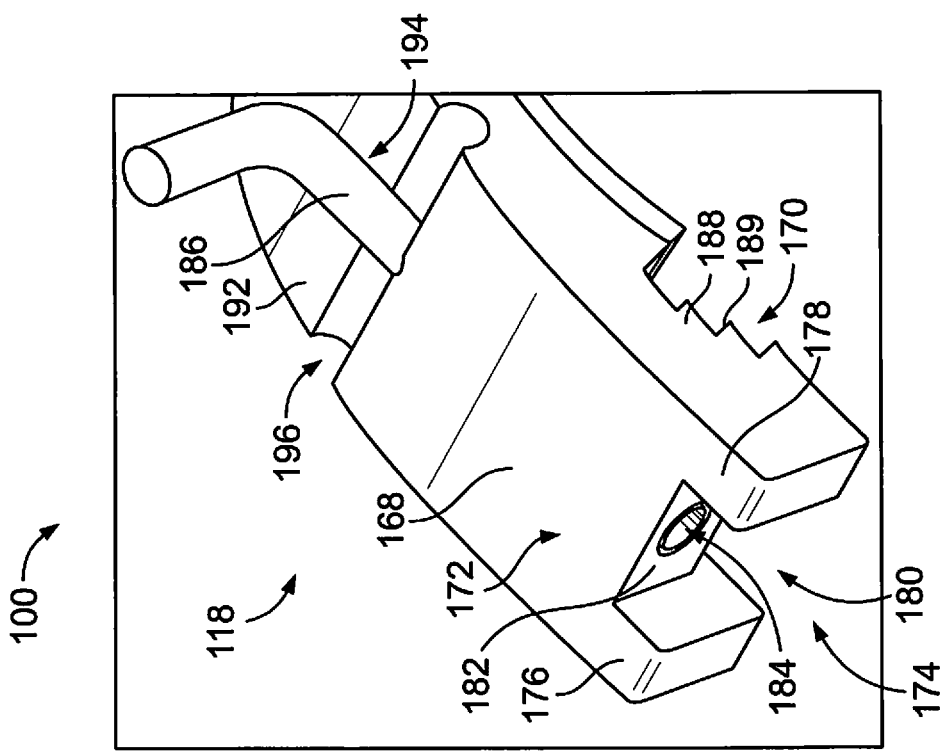
FIG. 4 is an enlarged view of the clamping device of FIG. 2 illustrating a coupling end in greater detail.

FIGS. 4 and 5 illustrate enlarged views of the coupling end 118 and the coupling base 122, respectively. The coupling end 118 is configured to attach to the coupling base 122 such that the first and second clamp sections 106, 108 (FIG. 1) are secured to each other and the clamping device 100 maintains the closed configuration. For example, as shown in FIG. 4, the coupling end 118 may include a latch element 168 having an inner surface 170 and an outer surface 172 that face in generally opposite directions. The latch element 168 also includes a mating face or side 174 that extends between the inner and outer surfaces 170, 172. The mating face 174 and the inner surface 170 are configured to directly interface with the second clamp section 108 (FIG. 1). The mating face 174 is defined in part by first and second tabs 176, 178 that are separated by a section space 180. An end surface 182 of the latch element 168 extends between the first and second tabs 176, 178. The first and second tabs 176, 178 project away from the end surface 182.

Optionally, the latch element 168 includes locking passage 184 having an opening at the end surface 182. In such embodiments, the clamping device 100 may include a fastener 186 that is inserted into the locking passage 184. As described herein, the fastener 186 may facilitate securing the coupling end 118 and the coupling base 122 (FIG. 1) to each other while the clamping device 100 is in use. In the embodiments illustrated herein, the fasteners are movable pins that include a threadless post or threaded post (e.g., screw). It should be understood, however, that a variety of fasteners may be used. For example, alternative fasteners may include latches, clips, clasps, elastomeric member (e.g., rubber band). It should be understood that the above examples are not necessarily mutually exclusive. For example, a latch may be a clasp in some instances.

The inner surface 170 of the latch element 168 may be shaped to attach to the coupling base 122 and prevent inadvertent removal of the first clamp section 106 away from the second clamp section 108. The inner and outer surfaces 170, 172 have profiles that form a locked engagement to hold the clamp frame 102 in the closed configuration. To this end, the clamping device 100 may include grip elements and mating elements. For example, the latch element 168 includes a series of grip elements 188 that define notches for receiving mating elements 190 (shown in FIG. 5) of the coupling base 122. The grip elements 188 and the mating elements 190 are similarly shaped in FIGS. 4 and 5 and may be similar to teeth. The grip elements 188 and the mating elements 190 include grip and mating surfaces 189, 191, respectively. The grip and mating surfaces 189, 191 are shaped such that when a grip surface 189 and a mating surface 191 engage each other, the grip and mating surfaces 189, 191 prevent the first clamp section 106 from being inadvertently removed. In an exemplary embodiment, the latch element 168 includes two series of grip elements 188 in which a first series of grip elements 188 is substantially aligned with the first tab 176 and the second series of grip elements 188 is substantially aligned with the second tab 178. However, in alternative embodiments, the clamping device 100 may include only a single grip element and a single mating element.

The fastener 186 is configured to slide through the passage 184. As shown, the first clamp section 106 has an outer surface 192 that is shaped to permit the fastener 186 to slide therealong. More specifically, the outer surface 192 defines a recess 194 that permits the fastener 186 to slide in axial direction such that an end of the fastener may slide into and out of the section space 180. Also shown, the outer surface 192 is shaped to include a locking channel 196. As described below, the locking channel 196 is configured to receive a portion of the fastener 186.

Turning to FIG. 5, the coupling base 122 is also shaped to attach to the coupling end 118 (FIG. 4). The coupling base 122 has an outer surface 198 that faces generally away from the passage 140 (FIG. 6). The coupling base 122 also includes a stage or platform 200. The stage 200 has a stage surface 201 that includes an opening to a passage 202. The stage 200 is configured to be received within the section space 180 (FIG. 4) when the clamping device 100 is in the closed configuration. In the closed configuration, the passage 202 is aligned with the passage 184 (FIG. 4). As shown, the coupling base 122 includes two series of the mating elements 190.

FIG. 6 is an enlarged side view of the clamping device 100 in the closed configuration. The fastener 186 is an unlocked position relative to the second clamp section 108 in FIG. 6. As shown, the first and second clamp sections 106, 108 are coupled to each other to form the passage 140. The coupling end 118 and the coupling base 122 engage each other along a seam 142. In particular embodiments, the seam 142 may represent the only discontinuity that extends entirely through the inner layer 104 and is positioned adjacent to the passage 140. During a closing operation, the first tab 176 or the second tab 178 may engage the stage 200. If the first clamp section 106 is misaligned, the first tab 176 or the second tab 178 may be deflected by the stage 200 to self-align the first clamp section 106 relative to the second clamp section 108.

In particular embodiments, the coupling end 118 and the coupling base 122 provide a primary locking mechanism that is followed by a secondary locking mechanism 185 that includes the fastener 186. Alternatively, the clamping device 100 may include only one locking mechanism, such as the primary locking mechanism or the second locking mechanism described herein. The inner and outer surfaces 170, 172 have profiles that form a locked engagement to hold the clamp frame 102 in the closed configuration.

For embodiments that include the grip and mating elements 188, 190, the grip elements 188 of the coupling end 118 and the mating elements 190 of the coupling base 122 may provide a ratcheted engagement. More specifically, the grip elements 188 include grip elements 188A, 188B, 188C, and the mating elements 190 include mating elements 190A, 190B, 190C. During a closing operation in which the coupling end 118 and the coupling base 122 are moved relatively toward each other, the grip surface 189 of the grip element 188A may initially engage the mating surface 191 of the mating element 190A. The grip surface 189 is a portion of the inner surface 170, and the mating surface 191 is a portion of the outer surface 172. The grip and mating elements 188A and 190A may engage each other and provide a tactile indication that the clamp frame 102 is partially closed. When the grip and mating elements 188A and 190A are engaged, the likelihood that the first clamp section 106 may inadvertently rotate away from the second clamp section 108 is reduced. This may be particularly useful for applications in which the longitudinal elements are compressed by the inner layer 104. In such cases, the longitudinal elements may provide an outward force that pushes the first clamp section 106 away from the closed configuration. During the closing operation, the grip element 188A may continue to slide along the outer surface 192 and engage each of the subsequent mating elements 190B, 190C. Likewise, the mating element 190A may continue to slide along the inner surface 170 and engage each of the subsequent grip elements 188B, 188C. As such, the first and second clamp sections 106, 108 may form a ratcheted engagement.

Figure 7:
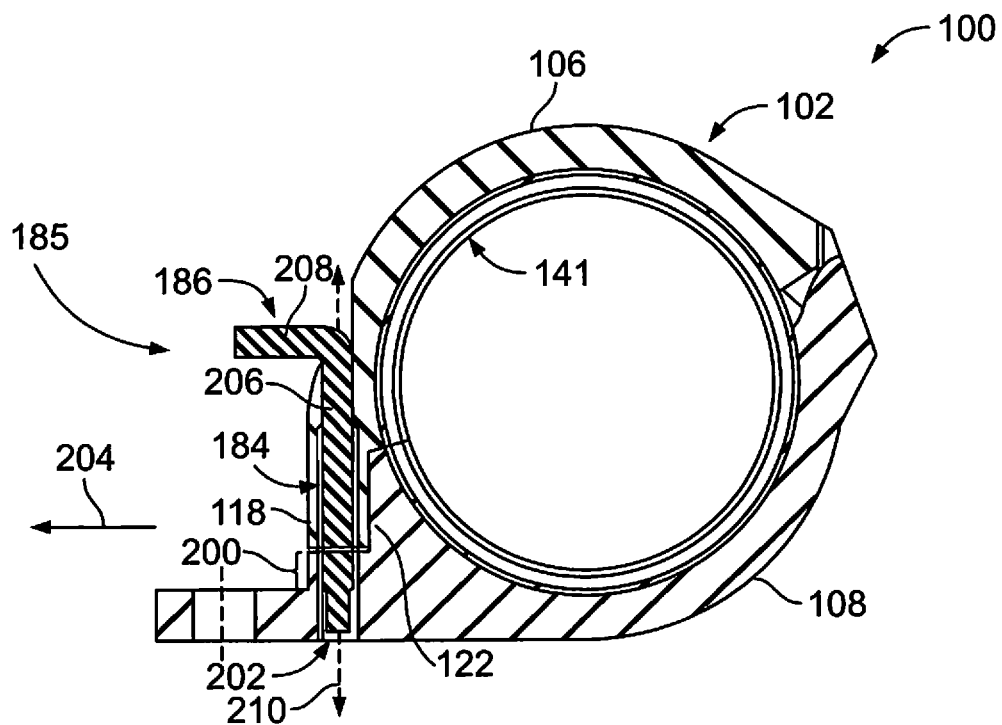
FIG. 7 illustrates a side cross-section of the clamping device of FIG. 2 when the clamping device is in the closed configuration and a secondary locking mechanism is engaged but not in a locked position.

FIG. 7 illustrates a side cross-section of the clamping device 100 in the closed configuration. In some embodiments, the secondary locking mechanism 185 includes the fastener 186, the passages 184, 202, and the locking channel 196. The secondary locking mechanism 185 secures the coupling end 118 and the coupling base 122 to each other. The fastener 186 includes a locking segment 206 and an operator-engaging segment or handle 208 that is coupled to the locking segment 206. The locking segment 206 is disposed within the passage 184 of the coupling end 118 and is configured to be inserted into the passage 202 of the coupling base 122. The operator-engaging segment 208 is accessible to an individual (e.g., technician) when the clamp frame 102 is in the closed configuration. As shown, the fastener 186 has a non-linear structure. The locking segment 206 and the operator-engaging segment 208 extend in perpendicular directions.

The fastener 186 is configured to be moved in an insertion direction and an opposite withdrawal direction along a pin axis 210. The fastener 186 is rotatable about the pin axis 210. Compared to FIG. 6, the fastener 186 has been advanced through the passage 184 of the coupling end 118 and into the passage 202 of the coupling base 122, but has not been rotated yet. The stage 200 provides an increased thickness to further reduce the likelihood that the fastener 186 would be inadvertently removed from the passage 202. When the first and second clamp sections 106, 108 are engaged as shown in FIG. 7, the profiles of the inner surface 170 (FIG. 4) and the outer surface 198 (FIG. 5) prevent the first clamp section 106 from inadvertently moving away from the second clamp section 108. However, the profiles of the inner and outer surfaces 170, 198 permit moving the first clamp section 106 if, for example, a lateral outward force 204 is applied to the coupling end 118. When the fastener 186 is inserted into the passage 202, the fastener 186 prevents the coupling end 118 from moving away from the coupling base 122. The fastener 186 is activatable after the clamp frame 102 is held in the closed configuration by the locked engagement between the inner and outer surfaces 170, 198. In some embodiments, the fastener 186 is captive such that the fastener 186 may not be removed. In other embodiments, the fastener 186 may be removable.

Figure 8:
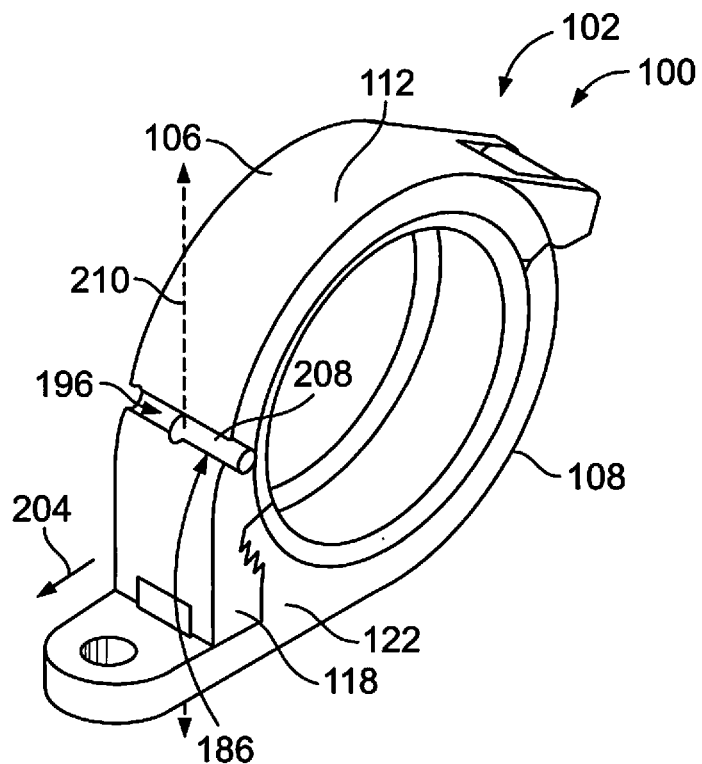
FIG. 8 illustrates a perspective view of the clamping device of FIG. 2 when the clamping device is in the closed configuration and a secondary locking mechanism has been engaged and moved into the locked position.

FIG. 8 illustrates a perspective view of the clamping device 100 when the clamping device 100 is in the closed configuration and the fastener 186 is in a locked orientation. Compared to FIG. 7, the fastener 186 has been rotated about the pin axis 210. As the fastener 186 is rotated, the operator-engaging segment 208 of the fastener 186 is received within the locking channel 196. In some embodiments, the operator-engaging segment 208 may form an interference fit (or snap fit) with the section body 112. For example, a portion of the section body 112 that defines the locking channel 196 may be sized relative to the operator-engaging segment 208 to form an interference fit. In some embodiments, the fastener 186 may include a projection (not shown) that is received within a corresponding cavity (not shown) of the clamp frame 102 that prevents the fastener 186 from being withdrawn.

To release the first and second clamp sections 106, 108 of the clamp frame 102, the fastener 186 may be rotated in the opposite direction to remove the operator-engaging element 208 from the locking channel 196 and the fastener 186 may be moved in the withdrawal direction along the pin axis 210. The coupling end 118 may then be moved in a lateral direction, such as about 90° with respect to the pin axis 210, with the outward force 204 and thereby detach the coupling end 118 and the coupling base 122.

Accordingly, the embodiment of FIGS. 1-8 provides a clamping device 100 that may be used to secure one or more longitudinal elements with respect to an external structure. Unlike known clamping devices, the clamping device 100 may be utilized without a tool. For example, the profiles of the inner and outer surfaces 170, 198 may provide a primary tool-less locking mechanism and the fastener 186 may provide a secondary tool-less locking mechanism. In this case, the fastener 186 is not considered a tool because the fastener 186 remains with the clamping device 100 during operation. It is noted, however, that other embodiments do not include more than one locking mechanism. For example, other embodiments may only include the primary locking mechanism or only include the secondary locking mechanism. It is also noted that other embodiments may be implemented using a tool that does not remain with the clamping device. Such an embodiment is described below with respect to FIGS. 11 and 12.

Embodiments may also enable a person to pre-mount the clamping device 100 and then position the longitudinal elements within the clamping device 100. For example, the thru-hole 154 (FIG. 1) of the mounting flange 150 allows the person to secure the clamping device 100 to an external structure (e.g., wall, panel). In some cases, the mounting flange 150 may be secured to the external structure prior to positioning the longitudinal elements within the passage 140 defined by first and second clamp sections 106, 108. While secured to the external structure, the person may position the longitudinal elements within the space defined by the clamp section 106 and/or the space defined by the clamp section 108. As described above, the person may position the longitudinal elements through multiple steps. For example, after a first longitudinal element is positioned within the space defined by one of the clamp sections, the person may release the first longitudinal element, retrieve a second longitudinal element, and then position the second longitudinal element within one of the spaces defined by the clamp sections.

In some embodiments, the clamping device 100 may allow utilization of a partially-closed configuration. For example, the coupling end 118 (FIG. 4) may be configured to attach to the coupling base 122 (FIG. 5) in a partially-closed configuration. In this configuration, less than all of the grip elements 188 (e.g., one or two of the grip elements 188) may engage the corresponding mating elements 190. The partially-closed configuration may hold the longitudinal elements that have already been positioned within the passage 140 while a person retrieves other longitudinal elements or addresses other matters away from the clamping device 100. The person may then return to the clamping device 100 and move the clamping device 100 into the fully closed configuration. Compared to the fully closed configuration, the partially-closed configuration may require less effort to move the clamping device 100 to the open configuration. Nonetheless, the clamping device 100 may temporarily hold the longitudinal elements while in the partially-closed configuration.

Figure 9:
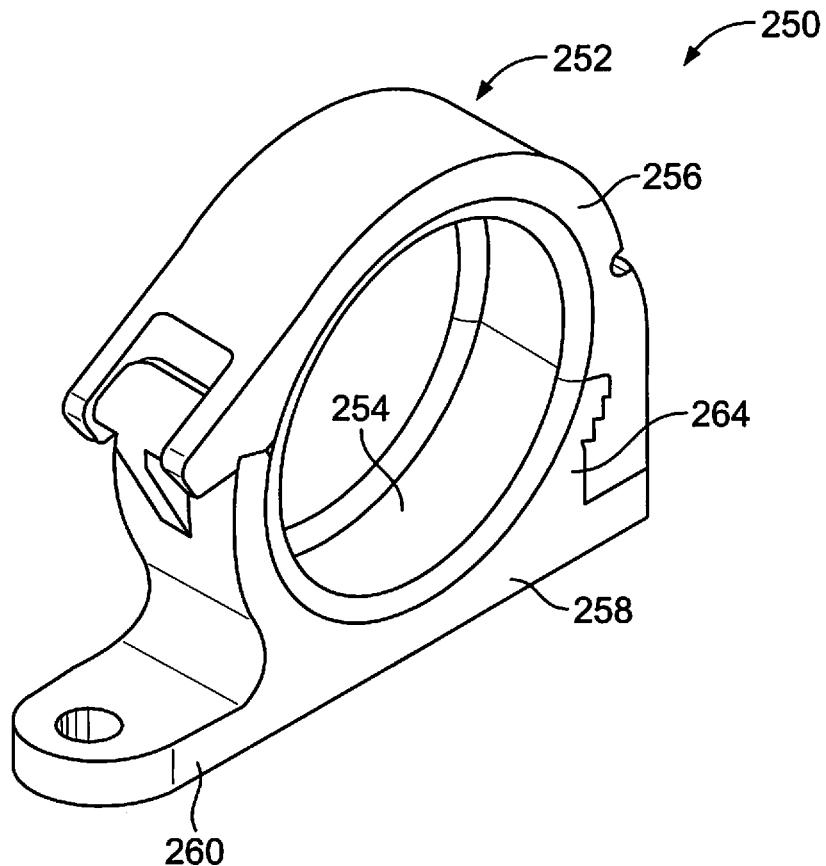
FIG. 9 is a perspective view of a clamping device formed in accordance with an embodiment when the clamping device is in a closed configuration. The secondary locking mechanism is located on the opposite side of the clamping device away from a mounting hole.

FIG. 9 is a perspective view of a clamping device 250 formed in accordance with an embodiment when the clamping device 250 is in a closed configuration. The clamping device 250 may include features that are similar to the features of the clamping device 100 (FIG. 1). For example, the clamping device 250 includes a clamp frame 252 and an optional inner layer 254 that is coupled to the clamp frame 252. In the illustrated embodiment, the clamp frame 252 includes a first clamp section 256 and a second clamp section 258. The first and second clamp sections 256, 258 are discrete structures that are configured to be coupled to one another to form the clamp frame 252. Similar to the clamping device 100, the first and second clamp sections 256, 258 have an articulated relationship in which the first and second clamp sections 256, 258 are rotatable about an axis of rotation.

The clamping device 250 also includes a mounting flange 260 that is similar to the mounting flange 150 (FIG. 1). The mounting flange 260, however, is located on an opposite side of the clamp frame 252 compared to the mounting flange 150. More specifically, the mounting flange 150 is attached to and projects away from the coupling base 122 (FIG. 1). The mounting flange 260 is coupled to the second clamp section 258 but positioned away from a coupling base 264.

Figure 10:
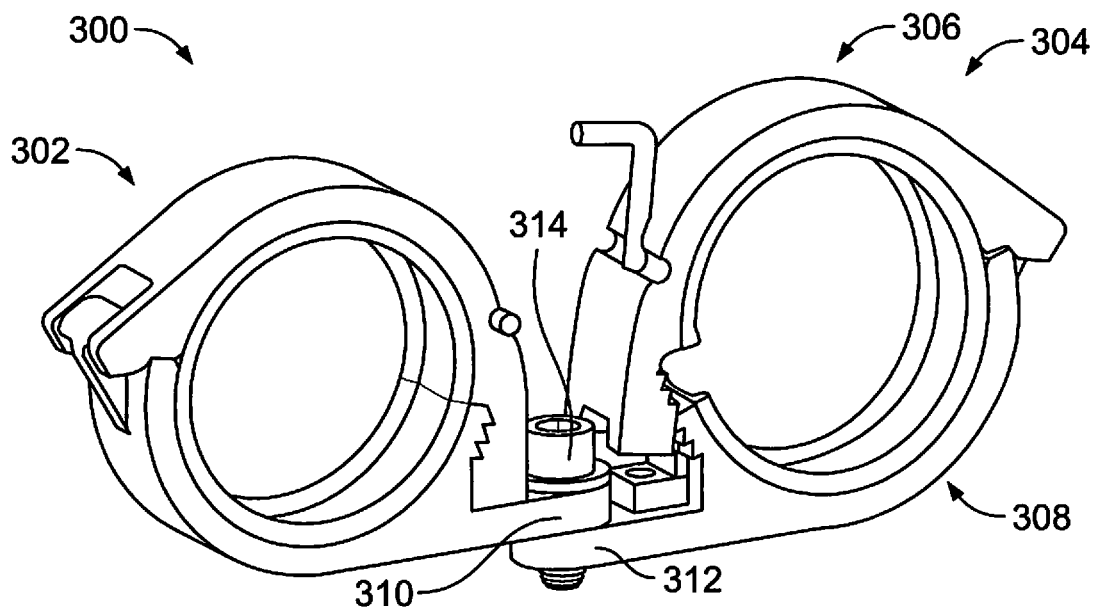
FIG. 10 is a perspective view of a clamping assembly formed in accordance with an embodiment that includes two clamping devices.

FIG. 10 is a perspective view of a clamping assembly 300 formed in accordance with an embodiment that includes first and second clamping devices 302, 304. The configuration shown in FIG. 10 may be referred to as a butterfly configuration. The clamping devices 302, 304 may be similar or identical to the clamping device 100 (FIG. 1). The clamping device 302 is in a locked and closed configuration in FIG. 10. The clamping device 304 is not in the closed configuration. As shown, the clamping device 304 includes first and second clamp sections 306, 308 that have initially engaged each other. In some embodiments, the first and second clamping devices 302, 304 may be configured to allow either of the clamping devices to be opened or closed while the other clamping device is closed. For example, the first clamp sections 306 may be shaped to clear the first clamp section of the other clamping device when opening or closing. In other embodiments, however, the first and second clamping devices 302, 304 may be configured to be closed and opened in accordance with a predetermined sequence.

The clamping devices 302, 304 include mounting flanges 310, 312, respectively. Each of the mounting flanges 310, 312 includes a thru-hole (not shown) that is configured to receive hardware 314 (e.g., bolt) for securing the clamping assembly 300 to an external structure (not shown). As shown, the mounting flanges 310, 312 are stacked with respect to each other such that the thru-holes are aligned and may each receive the hardware 314.

Figure 12:
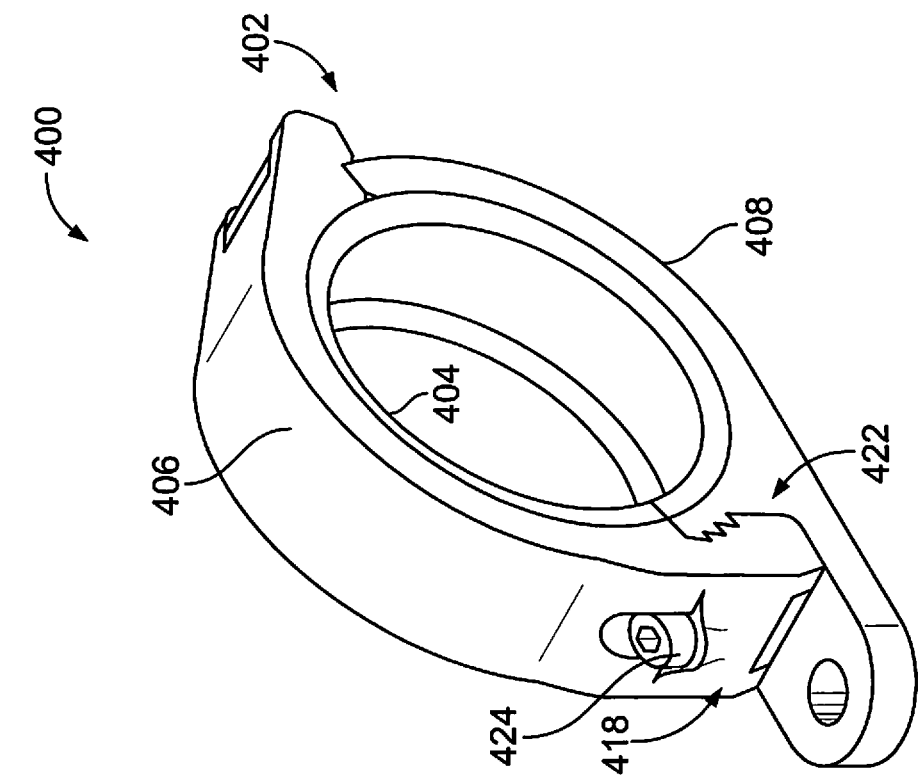
FIG. 12 is another perspective view of the clamping device of FIG. 11 when the clamping device is in the closed configuration.
Figure 11:
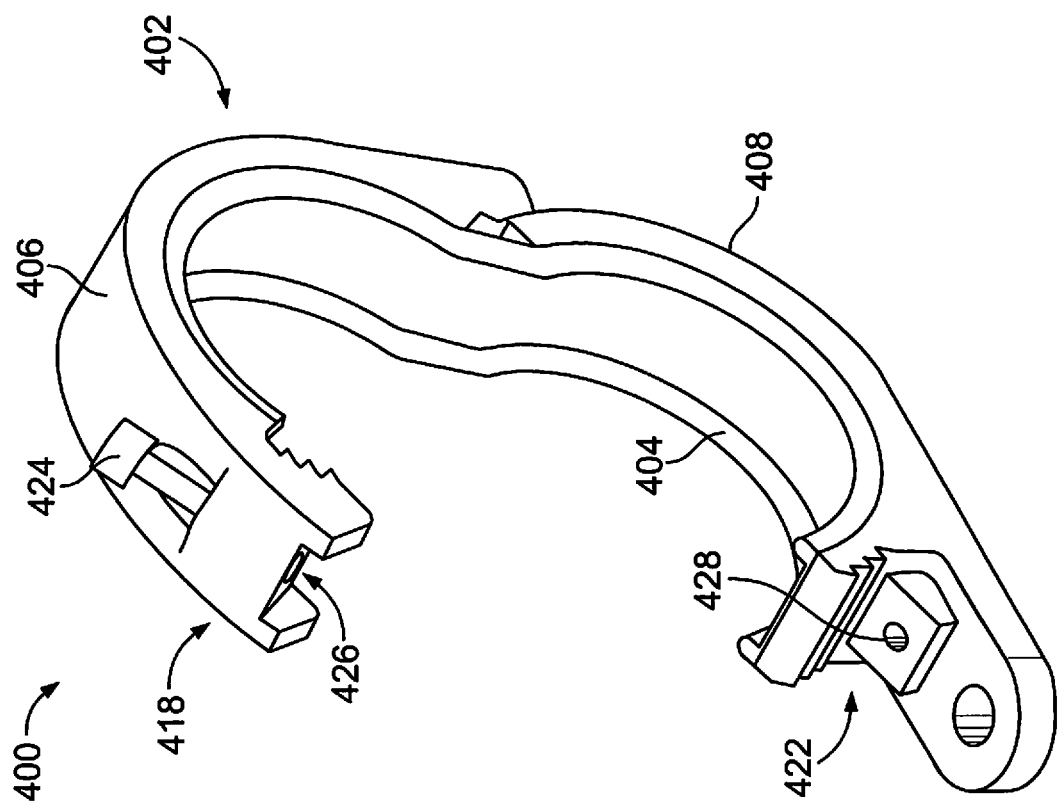
FIG. 11 is a perspective view of a clamping device formed in accordance with an embodiment when the clamping device is in an open configuration with an alternative threaded secondary locking mechanism.

FIGS. 11 and 12 are perspective views of a clamping device 400 formed in accordance with an embodiment when the clamping device 400 is in an open configuration and a closed configuration, respectively. The clamping device 400 may be similar to the clamping device 100 (FIG. 1). For example, the clamping device 400 includes a clamp frame 402 and an optional inner layer 404 that is coupled to the clamp frame 402. The clamp frame 402 includes a first clamp section 406 and a second clamp section 408. The first and second clamp sections 406, 408 are discrete structures that are configured to be coupled to one another to form the clamp frame 402. Similar to the clamping device 100, the first and second clamp sections 406, 408 have an articulated relationship in which the first and second clamp sections 406, 408 are rotatable about an axis of rotation.

The first and second clamp sections 406, 408 include a coupling end 418 and a coupling base 422, respectively. The coupling end 418 and the coupling base 422 may have surfaces with profiles that are similar to the surfaces 170, 198 (FIGS. 4 and 5, respectively). Unlike the coupling end 118 (FIG. 1) and the coupling base 122 (FIG. 1), the coupling end 418 and the coupling base 422 are configured to receive a threaded pin 424 (e.g., screw). For example, the coupling end 418 includes a passage 426 (FIG. 11) having the threaded pin 424 disposed therein. The coupling base 422 includes a passage 428 (FIG. 11) that is configured to receive the threaded pin 424. For example, the passage 428 may be defined by threads that engage the threaded pin 424. When the clamp frame 402 is in the closed configuration as shown in FIG. 12, the threaded pin 424 may be secured to the second clamp section 408. Accordingly, the threaded pin 424 is a fastener that is inserted through each of the passages 426, 428.

FIG. 13 illustrates a clamping device 500 that is similar to the clamping devices described herein. For example, the clamping device 500 includes first and second clamp sections 506, 508. As shown, a secondary locking mechanism 585 of the clamping device 500 includes a threaded pin 524 (e.g., screw). Also shown, the clamping device 500 includes first and second mounting flanges 550A, 550B. The first and second mounting flanges 550A, 550B are located opposite each other. Each of the mounting flanges 550A, 550B includes a thru-hole 554 for receiving hardware. Embodiments using more than one mounting flange may provide a more secure attachment to the external structure.

Figure 14:
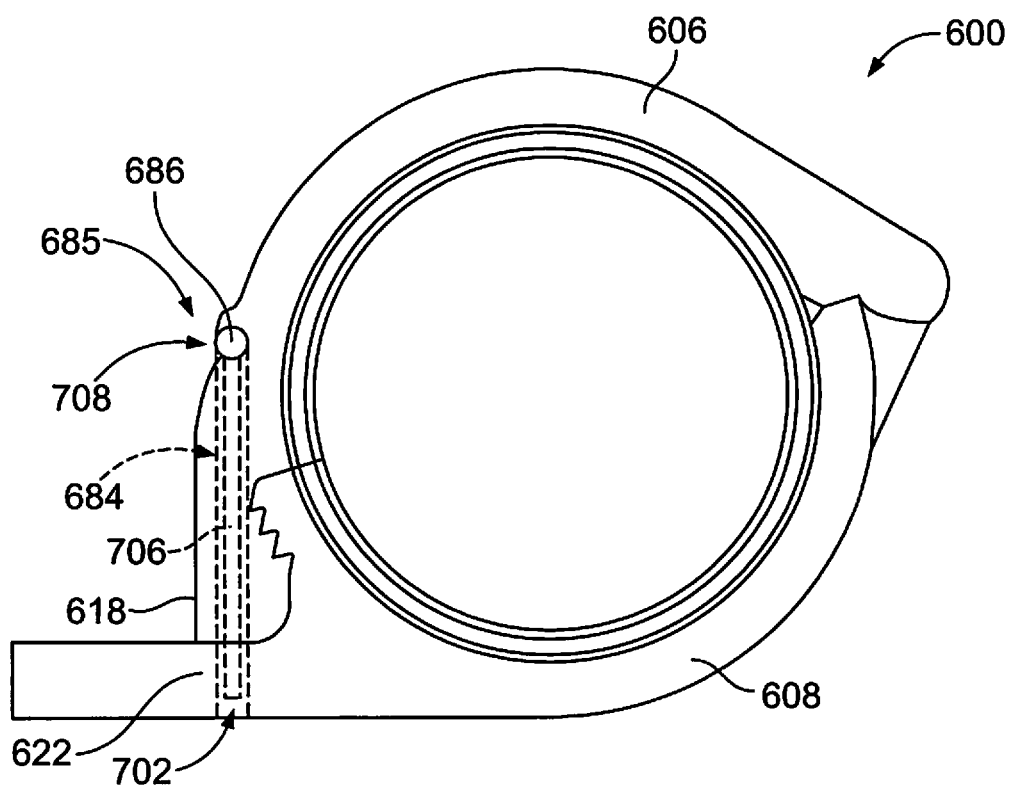
FIG. 14 illustrates a clamping device having a secondary locking mechanism in accordance with an embodiment that includes a movable fastener.

FIG. 14 illustrates a clamping device 600 that is similar to the clamping devices described herein. The clamping device 600 includes first and second clamp sections 606, 608. A secondary locking mechanism 685 of the clamping device 600 includes a fastener 686. The fastener 686 may be similar to or identical to the fastener 186. For example, the fastener 686 includes a locking segment 706 and an operator-engaging segment or handle 708 that is coupled to the locking segment 706. The fastener 686 may have a non-linear structure. The locking segment 706 is disposed within a passage 684 of a coupling end 618 of the first clamp section 606 and is configured to be inserted into a passage 702 of a coupling base 622 of the second clamp section 606. The operator-engaging segment 708 is accessible to an individual (e.g., technician).

Figure 15:
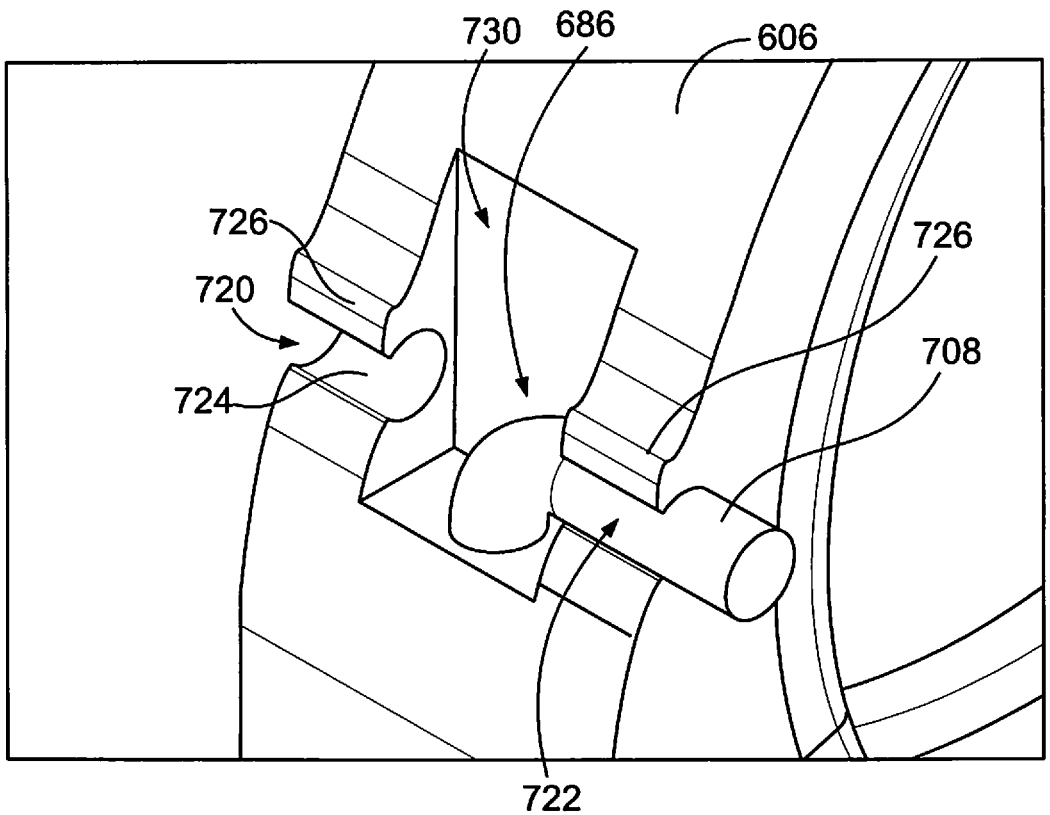
FIG. 15 illustrates the movable fastener of the secondary locking mechanism being in a first position.
Figure 16:
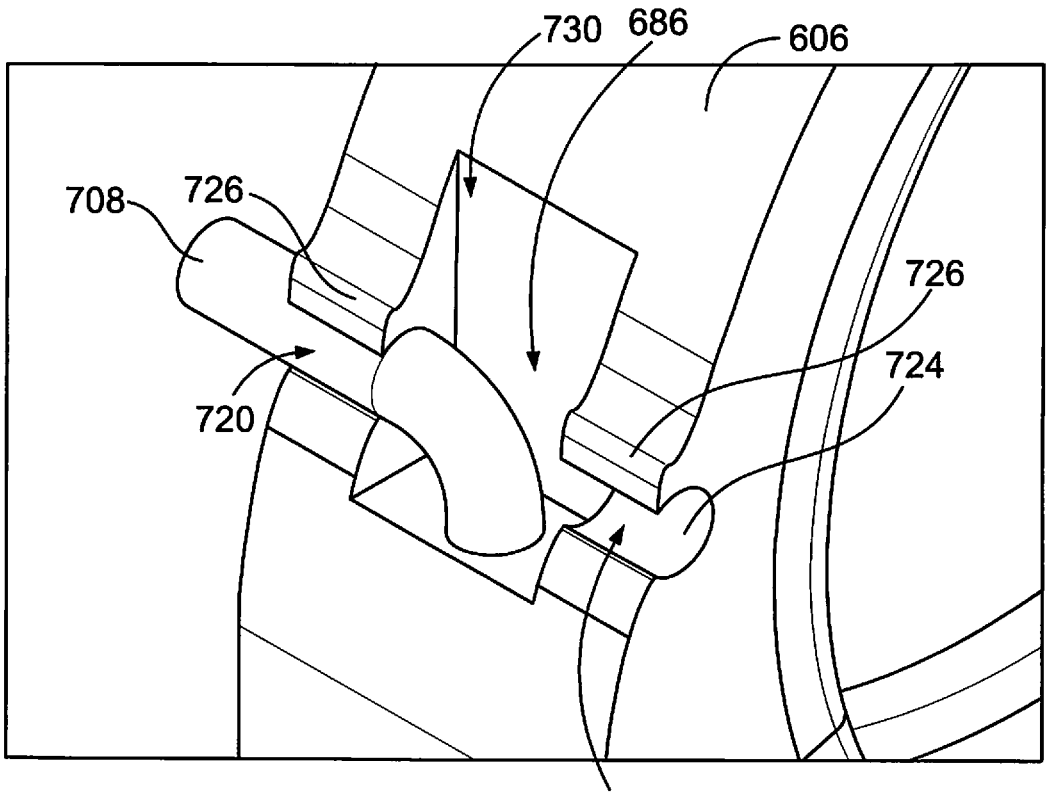
FIG. 16 illustrates the movable fastener of the secondary locking mechanism being in a second position.

FIGS. 15 and 16 provide enlarged views of a portion of the secondary locking mechanism. In the illustrated embodiment, the operator-engaging segment 708 is configured to be rotated in one of two positions to secure the operator-engaging segment 708 to the first clamp section 606. More specifically, the first clamp section 606 is shaped to form first and second locking channels 720, 722. The first clamp section 606 is also shaped to form a recess 730 where the operator-engaging segment 708 is freely movable. Each of the locking channels 720, 722 is defined by a contoured surface 724 that is sized and shaped to grip the operator-engaging segment 708. For example, the contoured surface 724 circumferentially surrounds more than half of the corresponding operator-engaging segment 708. The first clamp section 606 may include a grip finger 726. The grip finger 726 may permit a limited amount of deflection when the operator-engaging segment 708 engages the grip finger 726 and advances into the corresponding locking channels. The operator-engaging segment 708 and the contoured surface 724 form an interference fit such that the operator-engaging segment 708 does not inadvertently exit the corresponding locking channels during operation. In the illustrated embodiment, the secondary locking mechanism allows the user to rotate the fastener 686 in either direction. Although the illustrated embodiment shows two locking channels 720, 722, other embodiments may include only one locking channels.

It is to be understood that the above description is intended to be illustrative, and not restrictive. For example, the above-described embodiments (and/or aspects thereof)

may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112(f), unless and until such claim limitations expressly use the phrase "means for" followed by a statement of function void of further structure.

What is claimed is:

1. A clamping device comprising:
a clamp frame that is configured to move between an open configuration, in which the clamp frame is configured to receive at least one longitudinal element, and a closed configuration, in which the clamp frame wraps around and holds the at least one longitudinal element, the clamp frame including a coupling end having an inner surface and a coupling base having an outer surface, the inner and outer surfaces having profiles that provide a primary tool-less locking mechanism, the inner and outer surfaces directly engaging each other in the closed configuration along a seam that holds the clamp frame in the closed configuration, the seam being shaped such that the coupling end and the coupling base are locked in fixed positions with respect to one another in the closed configuration; and
a secondary tool-less locking mechanism that secures the coupling end and the coupling base to each other, the secondary tool-less locking mechanism being activatable after the clamp frame is held in the closed configuration by the seam, the secondary tool-less locking mechanism including a captive movable pin that is attached to the clamp frame in the closed configuration and in the open configuration and while the clamp frame moves from the closed configuration to the open configuration, the captive movable pin having a locking segment and an operator-engaging segment, the locking segment being insertable through a passage of the coupling end and a passage of the coupling base that is aligned with the passage of the coupling end, the operator-engaging segment being accessible to an individual when the clamp frame is in the closed configuration and designed to engage and lock the clamp frame in the closed configuration.

2. The clamping device of claim 1, wherein the coupling end includes at least one grip element having the inner surface and the coupling base includes at least one mating element having the outer surface, the grip element and the mating element of the coupling end and the coupling base, respectively, engaging each other to hold the clamping device in the closed configuration, the coupling end also including first and second tabs separated by a section space, the coupling base also including a stage having an opening to the passage of the coupling base, the stage sized and shaped to be positioned in the section space.

3. The clamping device of claim 1, wherein the clamp frame includes discrete first and second clamp sections that each have a respective joint end, the joint ends being movably coupled to each other, wherein the joint ends of the first and second clamp sections have respective blocking surfaces that are shaped to form an angle limit stop when the first and second clamp sections are in the open configuration, the angle limit stop preventing the first clamp section from rotating in a first direction that is further away from the closed configuration, the blocking surfaces also being shaped to prevent the first clamp section from rotating in an opposite second direction toward the closed configuration when a force less than a threshold force is applied.

4. The clamping device of claim 1, wherein the clamp frame includes a first clamp section and a second clamp section, the first clamp section having the movable pin attached thereto in the closed configuration and in the open configuration and while the clamp frame moves from the closed configuration to the open configuration, the first clamp section having the coupling end, the second clamp section including the coupling base, the operator-engaging segment designed to engage the first clamp section when the clamp frame is in the closed configuration, the locking segment having a distal end of the movable pin, the distal end being disposed within the passage of the coupling base.

5. The clamping device of claim 1, wherein the seam is positioned closer to the longitudinal element than the passage of the coupling base.

6. The clamping device of claim 1, wherein a pin axis extends through the locking segment and wherein at least a portion of the operator-engaging segment extends away from the pin axis, the locking segment being insertable through the passages of the coupling end and the coupling base in an insertion direction along the pin axis, wherein the movable pin is rotatable about the pin axis between first and second positions when the clamp frame is in the closed configuration, the clamp frame including an exterior surface that defines a locking channel, the movable pin permitted to be moved in a withdrawal direction that is opposite the insertion direction when the movable pin is in the first position, the operator-engaging segment being received within the locking channel and engaging the clamp frame as the movable pin is rotated into the second position, the exterior surface preventing the operator-engaging segment from moving in the withdrawal direction when the movable pin is in the second position.

7. The clamping device of claim 6, wherein the clamp frame includes a first clamp section and a second clamp section, the first clamp section having the movable pin attached thereto in the closed configuration and in the open configuration and while the clamp frame moves from the closed configuration to the open configuration, the first clamp section including the coupling end and the locking channel, the second clamp section including the coupling base.

8. The clamping device of claim 1, wherein the clamp frame includes discrete first and second clamp sections that each have a respective joint end, the joint ends being movably coupled to each other, further comprising an inner layer that is coupled to and extends along the first and second clamp sections, the inner layer forming a gap-less engaging surface that prevents pinching of the at least one longitudinal element.

9. The clamping device of claim 8, wherein the first and second clamp sections form a pinching gap therebetween when the clamp frame is in the open configuration, the inner layer extending over the pinching gap, wherein the inner layer includes a first layer end on the first clamp section and a second layer end on the second clamp section, the first and second layer ends defining an interface therebetween when in the closed configuration, the seam including the interface.

10. The clamping device of claim 1, wherein the inner surface includes a series of teeth-shaped elements and the outer surface include a series of teeth-shaped elements, the teeth-shaped elements of the outer surface directly engaging the teeth-shaped elements of the inner surface in a ratcheted manner as the clamp frame closes, the teeth-shaped elements of the inner and outer surfaces defining at least a portion of the seam.

11. The clamping device of claim 10, wherein the teeth-shaped elements of the inner surface project radially inward toward the longitudinal element in the closed configuration, and the teeth-shaped elements of the outer surface project radially outward away from the longitudinal element in the closed configuration.

12. A clamping device comprising:
a clamp frame that is configured to move between an open configuration, in which the clamp frame is configured to receive at least one longitudinal element, and a closed configuration, in which the clamp frame wraps around and holds the at least one longitudinal element, the clamp frame including a coupling end having an inner surface and a coupling base having an outer surface, the inner and outer surfaces directly engaging each other in the closed configuration along a seam, the seam being shaped such that the coupling end and the coupling base are locked in fixed positions with respect to one another in the closed configuration; and
a secondary locking mechanism that secures the coupling end and the coupling base to each other, the secondary locking mechanism being activatable after the clamp frame is held in the closed configuration by the seam;
wherein the secondary locking mechanism includes a fastener that is inserted through respective passages of the coupling end and the coupling base, wherein the fastener has a locking segment and an operator-engaging segment, wherein a pin axis extends through the locking segment and at least a portion of the operator-engaging segment extends away from the pin axis, the locking segment being insertable through the passages of the coupling end and the coupling base in an insertion direction along the pin axis, the operator-engaging segment being accessible to an individual when the clamp frame is in the closed configuration and rotatable about the pin axis;
wherein the fastener has a non-linear structure and is rotatable about the pin axis between first and second positions when the clamp frame is in the closed configuration, the clamp frame including an exterior surface that defines a locking channel, the operator-engaging segment configured to be received within the locking channel and engage the clamp frame when the fastener is rotated into the second position, the fastener permitted to be moved in a withdrawal direction that is opposite the insertion direction when the fastener is in the first position, the exterior surface preventing the operator-engaging segment from moving in the withdrawal direction when the fastener is in the second position.

13. The clamping device of claim 12, wherein the clamp frame includes a first clamp section and a second clamp section, the first clamp section having the coupling end and the locking channel, the second clamp section including the coupling base, the operator-engaging segment configured to be received within the locking channel and engage the first clamp section when the fastener is rotated into the second position.

14. A clamping device comprising:
a first clamp section having a joint end and a coupling end;
a second clamp section having a joint end and a coupling base, wherein the joint ends of the first and second clamp sections are movably coupled to each other such that the first and second clamp sections are movable between an open configuration and a closed configuration, the coupling end of the first clamp section and the coupling base of the second clamp section engaging each other in the closed configuration to provide a clamp frame for holding at least one longitudinal element, wherein portions of the joint ends of the first and second clamp sections form a pinching gap therebetween when the first and second clamp sections are in the open configuration, the portions of the joint ends moving away from each other as the first and second clamp sections move toward the open configuration, the portions of the joint ends moving toward each other as the first and second clamp sections move toward the closed configuration; and
an elastic inner layer that is coupled to and extends along the first and second clamp sections, the inner layer being secured to the first clamp section and the second clamp section in the open configuration and in the closed configuration and while the first and second clamp sections move to the closed configuration, the inner layer configured to engage the at least one longitudinal element, wherein the inner layer stretches over the pinching gap and provides, when stretched over the pinching gap, a retracting force that facilitates moving the first and second clamp sections toward the closed configuration.

15. The clamping device of claim 14, wherein the coupling end includes an inner surface and the coupling base includes an outer surface, the inner and outer surfaces directly engaging each other in the closed configuration along a seam, the seam being shaped such that the coupling end and the coupling base are locked in fixed positions with respect to one another in the closed configuration, the inner and outer surfaces forming a ratcheted engagement along the seam.

16. The clamping device of claim 14, further comprising a mounting flange that projects away from the first clamp section or the second clamp section, the mounting flange having a thru-hole that is configured to receive hardware for securing the clamping device to an external structure.

17. The clamping device of claim 14, wherein the first clamp section includes a molded section body that defines the joint end of the first clamp section and the coupling end, the second clamp section including a molded section body that defines the joint end of the second clamp section and the coupling base, the molded section bodies of the first and second clamp sections being discrete structures.

18. The clamping device of claim 14, further comprising a captive movable pin that is attached to the first claim section in the closed configuration and in the open configuration, the captive movable pin having a locking segment and an operator-engaging segment, the locking segment being insertable through respective passages of the coupling end and the coupling base, the operator-engaging segment being accessible to an individual and designed to engage and removably couple to an exterior surface of the first clamp section when the clamp frame is in the closed configuration.

19. The clamping device of claim 14, wherein the joint ends of the first and second clamp sections have respective blocking surfaces that are shaped to prevent, when the first and second clamp sections are in the open configuration, the first clamp section from rotating toward the closed configuration when a force less than a threshold force is applied.

20. The clamping device of claim 19, wherein the blocking surfaces are also shaped to form an angle limit stop when the first and second clamp sections are in the open configuration, the angle limit stop preventing the first clamp section from rotating in a first direction that is further away from the closed configuration.

* * * * *